United States Patent Office 3,769,378
Patented Oct. 30, 1973

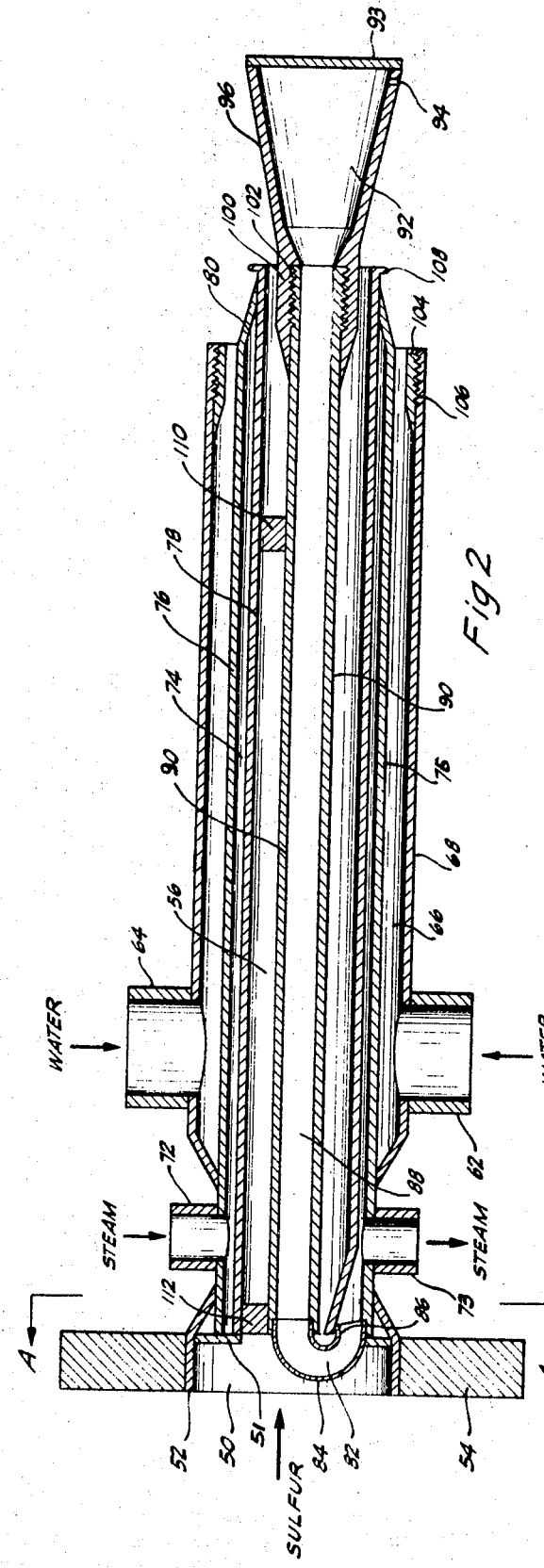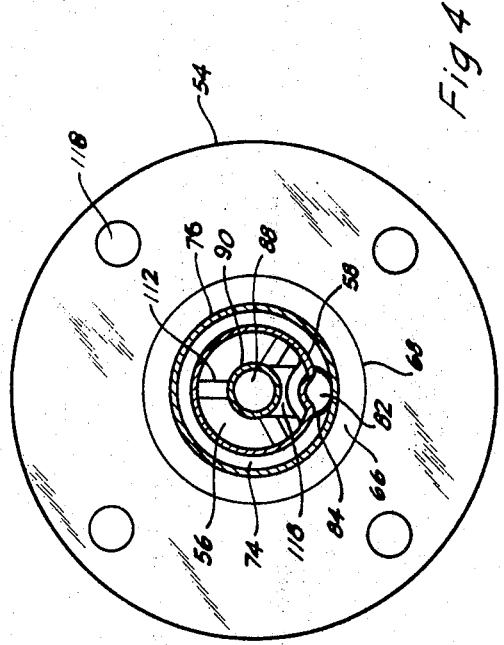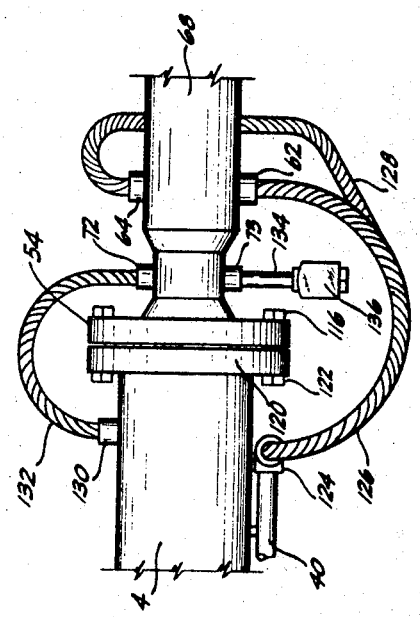

3,769,378
METHOD FOR THE PREPARATION OF POROUS, PARTICULATE SULFUR
Donald C. Young, Fullerton, and Bruce A. Harbolt, Northridge, Calif., assignors to Union Oil Company of California, Los Angeles, Calif.
Original application July 30, 1969, Ser. No. 846,141, now Patent No. 3,637,351. Divided and this application Sept. 9, 1971, Ser. No. 178,940
Int. Cl. B01j 2/06
U.S. Cl. 264—11
9 Claims

ABSTRACT OF THE DISCLOSURE

A method for preparing porous sulfur particles by discharging, into a vapor space at substantially atmospheric pressure, water and molten sulfur in intimate admixture to form sulfur droplets having a continuous sulfur phase and a contained water phase, permitting the sulfur droplets to solidify into discrete particles and the water to separate therefrom. This can be accomplished by discharging molten sulfur and water from separate conduits and into intimate admixture in the atmopshere. The sulfur is solidified into porous particles and the momentum of the combined streams is sufficient to convey the sulfur to a desired location on a storage pad. The invention is useful in conveying molten sulfur from tanks of a truck or tankcar to a storage site for further delivery to consumers.

DESCRIPTION OF THE INVENTION

This application is a division of our copending application, Ser. No. 846,141, filed July 30, 1969, now U.S. Pat. 3,637,351. The invention relates to a method for the solidification of molten sulfur and, in particular, a method for forming sulfur into discrete porous particles while conveying or distributing the sulfur onto a storage area.

Elemental sulfur is presently obtained in large quantities from hydrogen sulfide contained in petroleum refinery gas streams. The elemental sulfur is generally transported to field storage or distribution sites in the molten state. The molten sulfur at the field distributing plant is pumped onto concrete pads open to the atmosphere or into enclosed storage bins for storage whereupon the molten sulfur solidifies into large slabs. The slabs of sulfur must be mechanically broken up for final distribution to the consumer. This operation is cumbersome and entails much labor and expense, and without extensive grinding, the resulting sulfur in the form of relatively large hunks and is difficult to handle and utilize.

Molten sulfur may be solidified into small prills by employment of "prilling towers" such as shown in U.S. Pat. 3,334,159, however, the installation of such towers at distribution sites is costly and is not normally economically justified. In addition, the sulfur prill obtained from the conventional prilling operation is a dense, hard bead as opposed to the more desirable porous prill obtained by use of the invention described herein.

An object is to provide an improved method for solidifying sulfur.

A further object is to provide a method for solidifying sulfur into small porous particles and placing said particles into selected storage areas.

Other and related objects will be readily apparent from the following description.

The foregoing objects are achieved by the method of this invention which comprises discharging and admixing water and molten sulfur under highly turbulent conditions into a substantially unconfined zone. The molten sulfur and water admix in this highly turbulent region and the molten sulfur is formed into discrete droplets which solidify into small, porous, low-density prills. In the preferred embodiment, the velocity and trajectory of discharged streams of sulfur and water are controlled to convey the sulfur prills to selected storage sites.

The preferred device for conducting the above method briefly comprises a first conduit for forming and discharging a stream of water with the discharges from the conduits directed to admix the streams of sulfur and water in a turbulent region. The sulfur, with the aid of the momentum of the water stream, is sprayed into the atmosphere and onto a preselected storage area. In one embodiment the sulfur conduit is positioned concentrically within the water conduit and baffle means are positioned downstream of the sulfur discharge to deflect the sulfur stream into the surrounding water stream at an angle inclined to the longitudinal axis less than about 20° and, preferably, less than 15°. Means are provided to supply molten sulfur and water to the conduits and heating means are provided to prevent plugging of the device by sulfur solidification during shutdown of the device. At the exit end of the device, baffle means can be provided to aid in the contacting of sulfur and water and to increase the turbulence of the mixture. Also preferably provided within and at the exit end of the sulfur and water conduits are restriction or nozzle means to increase the exit velocities of the sulfur and water and, hence, the turbulence of mixing without unduly restricting flow through the conduits.

The sulfur and water thus admixed are dispersed from the device into the atmosphere at relatively high velocities. The sulfur is solidified into small porous particles which can be sprayed, by the combined momentum of the water and sulfur streams, onto a desired location of a storage area. Horizontal trajectories of 10 to 100 feet, more generally 20 to 60 feet can be obtained and the sulfur may be piled to a height of from 10 to 100 feet, preferably 25 to 50 feet, as determined by the diameter of the base of the pile and maximum angle of repose of the particles. The water drains from the sulfur leaving a pile of relatively dry sulfur particles which may be conveniently loaded onto trucks for transportation to the consumer. The sulfur particles possess very desirable properties such as high grindability, high porosities and high specific surface area which are beneficial to the consumer.

The invention will now be described by references to the figures, of which,

FIG. 2 is a side elevation of the preferred means for practicing the invention;

FIG. 3 is a schematic showing an external view of the device as it is connected to supply means for sulfur, water and the heating means;

FIG. 4 is a sectional view of the inlet of the device taken at Section "A," FIG 2.

Figure 1:
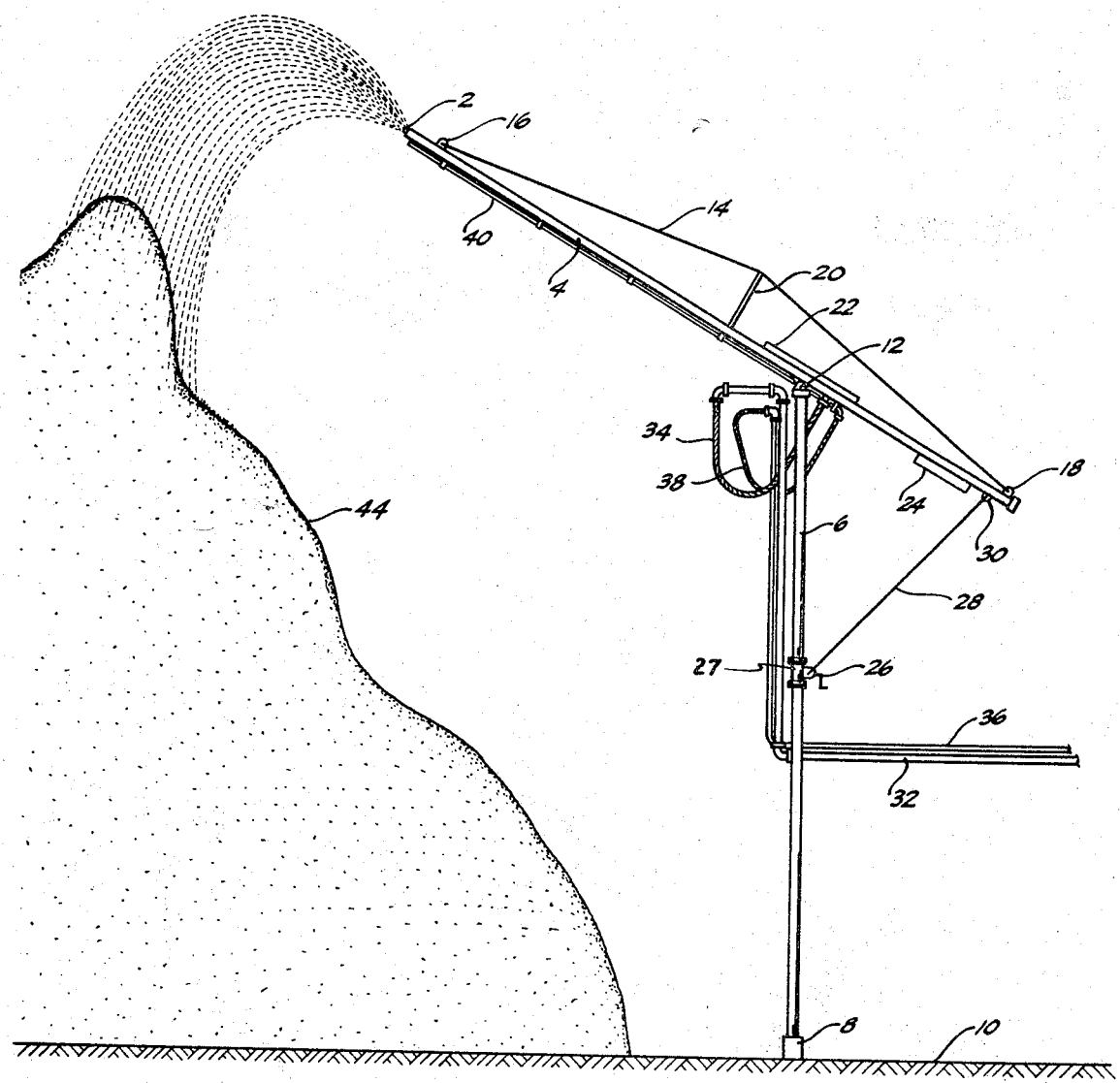
FIG. 1 is a general schematic view of the system.

Referring to FIG. 1, the device 2 is supported on a boom 4 such that the device is elevated above the ground and can be directed to convey the sulfur particles to any desired location on the storage pad 10. Boom 4 is pivotably attached to yoke 12 which is rotatably mounted on support 6 to permit moving device 2 vertically and/or horizontally. To aid in elevating device 2, spindle 26 and cable 28 are provided. The spindle is mounted on a suitable sleeve 27 which can be rotated about support 6. Counterweights 22 and 24 are provided to stabilize the boom 4 and strut 20 and cable 14 are provided to restrain flexing of boom 4. The boom can be rotated about support 6 to direct sulfur to any desired area on the storage pad 10.

Means are provided to supply the molten sulfur, water and steam to the prilling device. The molten sulfur is transferred from the truck, tank car or other transporting means into a storage tank and is then pumped into steam-jacketed line 32. The molten sulfur flows through line 32 and steam-jacketed flexible hose 34 into a pipe (not shown) which is concentrically contained within the outer pipe of boom 4. Steam likewise flows into boom 4 from the jacket of hose 34 and into a conduit defined by the interior of the outer pipe of boom 4 and the exterior of the aforementioned sulfur line contained within boom 4. Sulfur and steam flow concentrically through the aforementioned conduits contained in boom 4 and into the prilling device 2 as will be described hereinafter. Water is supplied through line 36, flexible hose 38 and line 40 which is attached to and contained outside of boom 4 as shown.

Referring now to FIG. 2 through 4, the prilling device used in carrying out the method comprises a set of concentric conduits 68, 76, 78 and 90 which are secured to flange 54 having radially spaced bolt holes 118. Secured in the base of flange 54 is a sleeve 52 which has one end rolled into a frusto-conical shape and is welded to the outer surface of conduit 76. Ring 51 is mounted within sleeve 52 and the ends of conduits 76 and 78 are butt welded to the ring. The inner conduit 90 is supported by conduit 78 with spacers or lugs 110.

The annual passageway 74 between conduits 76 and 78 is in communication with the inner conduit 90 by the U-shaped conduit 84 which fits into an annular seat about the inner periphery of conduit 90. The under surface of conduit 78 is crimped slightly and a semi-circular cut is made in ring 51 to define an opening 82 (see FIG. 4) into which is fitted the remaining end of U-shaped conduit 84 which thereby provides communication between annular passageway 74 and conduit 90.

Conduit 68 has one end rolled into a frusto-conical shape which mates with and is welded to the outer periphery of conduit 76 at a point downstream of sleeve 52 to provide an assembly having a neck of reduced diameter (see FIG. 3). Nozzles 72 and 73 are carried by conduit 76 at this neck portion to provide communication with annular passageway 74. Nozzles 62 and 64 are carried by conduit 68 to provide communication with annular passageway 66 defined by conduits 68 and 76.

At its opposite end, conduit 68 is opened. Preferably, a nozzle 104 is formed by a sleeve which is secured to the inner periphery of conduit 68 to reduce its diameter and provide an annular orifice, thereby serving as a discharge nozzle. Nozzle 104 can be permanently attached to conduit 68 or, as shown, can be removably attached by threaded joint 106. If desired, nozzle 104 can have an arcuate inner periphery to define a smoothly converging entrance to the annular orifice or can have, as shown, a simple conically tapered entrance.

The end of conduit 76 is rolled into a frusto-conical shape and is welded to conduit 78 to close annular passageway 74. Conduit 78 is open-ended and bears an annular lip 108. Conduit 90 supports a conical member 96 having a hollow neck 100 that fits over conduit 90 and is removably secured thereto by threads 102. Alternatively, neck 100 could be permanently welded to conduit 90. Neck 100 partly obstructs the open end of annular passageway 56 and thereby serves as a discharge nozzle. As with nozzle 104, the nozzle which is thus formed by neck 100 can have a smoothly converging throat by shaping the outer periphery of neck 100 into an arcuate path along its longitudinal axis or, as shown, the inner end of neck 100 can simply be tapered. Conical member 96 is preferably hollow and closed with end cap 93 to define a chamber 92 that is in communication with conduit 90. One or more holes 94 are bored through the underside of conical member 96.

Referring now to FIG. 3, device 2 is supported by boom 4 by flange 54 which is removably attached to end flange 120 by bolts 116 and nuts 122. As previously mentioned boom 4 comprises two concentric conduits and the inner conduit is in open communication with device 2 through bore 50 of flange 54. The annular jacket of boom 4, however, is sealed by flange 120 and nozzle 130 is positioned at the terminal end of boom 4 to communicate with the annular jacket. A flexible hose 132 is attached between nozzles 130 and 72. Attached to nozzle 73 by sleeve 134 is a steam trap 136. Conduit 40 bears T 124 to which are attached the ends of flexible hoses 126 and 128. The opposite ends of these hoses are attached to nozzles 62 and 64.

In operation, sulfur flows into an annular passageway 56 from the inner conduit of boom 4. The sulfur is maintained in a molten condition by heating means associated with device 2. These means comprise the conduit 76 and conduit 90 which define, respectively, an annular passageway 74 and central passageway 88 for a heating fluid which is preferably steam. Steam from the annular jacket of boom 4 flows into nozzle 72 of device 2 via flexible hose 132. Excess steam is vented to the atmosphere by steam trap 136 and through bore 94 in conical member 96. Any condensate in member 96 is also expelled through bore 94. Water from line 40 flows into nozzles 62 and 64 of device 2 through flexible hosing 126 and 128.

Water flows into passageway 66. Nozzle 104 constricts the discharge of water from passageway 66 so that a desirably high exit velocity of the water is provided. The molten sulfur flows through the passageway 56. The discharge of the passageway 56 is partly restricted by the nozzle formed by neck 100 which is preferably attached to the outer periphery of conduit 90 to deflect the sulfur stream towards the outer water stream. The exit velocity of sulfur is increased as it is discharged through the constricted thoat of the nozzle formed by neck 100 and the sulfur is thus discharged at a high velocity out of the sulfur conduit and into contact with conical member 96 which serves as a baffle and further deflects the sulfur into contact with the water stream.

Thus the molten sulfur and water, aided by the nozzle means at the exit end of their passageways in device 2 and by the member 96 are contacted in the highly turbulent region at their discharge from device 2. The sulfur is dispersed into discrete droplets with water contained within the sulfur droplets. Sulfur is solidified in the atmosphere by the joint action of water and air, the water separates from the sulfur to form a porous particle. The sulfur particles and water are jetted through the atmosphere as a combined stream and fall onto a storage area. The water readily drains from the sulfur particles, leaving a bulk amount of dry, porous sulfur prills.

The device 2 is operated to achieve a single discharge spray which comprises a heterogeneous mixture of sulfur and water droplets. This intimate admixing can be accomplished by blending the separate streams of molten sulfur and water approximately at the region of their minimum cross-sectional areas. As previously mentioned, nozzle 104 and the nozzle formed by neck 100 provide orifices at the discharges, respectively, of the water and molten sulfur passageways. The minimum cross-sectional area, i.e., the vena contracta, of the sprays from these orifices occur from about 0.2 to about 1.5 pipe diameters downstream of the orifices and within this distance, the sulfur stream should be blended into the water spray.

The blending of the streams can occur if the discharges are substantially parallel and in very close proximity. Thus, it has been found that if the conduit 76 is eliminated from the structure so that the water and sulfur discharges are separated only by the thickness of a single metal wall 78, the streams will blend without conical member 96 which provides deflecting baffle means. With the device of FIG. 2, however, the thickness of the steam passageway 74 necessitates, for intimate admixing, the use of the conical member 96 which is positioned within the aforementioned spacing of from 0.2 to 1.5 pipe diameters downstream of the stream discharges.

The water conduit is shown in FIG. 2 as terminating a minor distance, e.g., 1–10% of the length of the conduit, prior to termination of the sulfur conduit. In this manner and aided by lip 108, sulfur is prevented from flowing into the water conduit and plugging any portion of the discharge of the water passageway during shutdown of the device. Alternatively, conduit 68 can be extended to terminate substantially at the same point along the longitudinal axis as the conduit 78 to improve mixing conditions of the water and sulfur streams.

As described hereinabove, baffle means in the form of conical member 96 are provided at the exit of the prilling device to aid in the admixing of sulfur and water. Conical member 96 functions to deflect the sulfur stream into contact with the water stream. Some of the water stream is also impinged against conical member 96 and in this manner intimate contact of the sulfur and water is insured. The side walls of conical member 96 can have an angle of inclination from the longitudinal axis of the device from 3° to about 35°, preferably from 5° to about 25° with the length of the conical member 96 correlated with its sidewall angle to achieve the above objectives. The sidewall angle of the conical member should not be great enough to impart a radial velocity vector to the sulfur sufficient to cause the sulfur to penetrate through and escape from the water stream, thereby becoming removed from contact with water. Also it is preferred that the sidewall angle and/or length of the conical member be such that at least a substantial amount, e.g., 40–100 percent, preferably 70–100 percent, of the water stream is not deflected by the conical member 96 thereby retaining a substantial trajectory of the combined streams which is useful in conveying and distributing sulfur to desired storage locations. To achieve this objective, the diameter of the base of conical member 96 and the position of conical member 96 are selected so that the base does not extend into the longitudinal extension of annular passageway 66. The angle and length of the conical member, as well as the sulfur and water-exit velocities, affect the mixing of water and sulfur and thus the properties of the ultimate sulfur prills, as will be discussed hereinafter. It may be desired that the properties of the sulfur particles be varied depending on consumer demands and hence several conical members with varied length and angles of inclination can be provided by use of removable attachment and hence use of screw fittings 102 are preferred.

Steam is introduced into the prilling device in sufficient quantity and/or superheat to insure that the sulfur is retained in the molten state as it flows through the prilling device. Steam flows into passageway 74 defined by pipes 76 and 78 and through space 82 defined by U tube 84 into passageway 88 defined by conduit 90. The steam also flows through conduit 90 and into conical member 96 to insure that the sulfur does not solidify on and adhere to the exterior of conical member 96. Condensate is removed through nozzle 73 and steam trap 136 and through bore 94 in conical member 96.

Alternative to the use of U-shaped conduit 84 and jacket conduit 76, the steam may be introduced directly into passageway 88 by a nozzle communicating with conduit 90. In this manner sulfur is heated only from the interior of the prilling device and the water conduit is in direct communication with the sulfur conduit with no intervening steam jacket. This embodiment has the advantage that better mixing of the sulfur and water stream can be achieved at the exit end of the device in that there is a minimum of area separating the respective streams as they flow out of the prilling device.

As stated earlier herein, the sulfur is sprayed out into the atmosphere and onto a storage pad by the joint action of the momentum of the sulfur stream and the water stream. Simultaneously the sulfur is solidified into small porous particles. A surprising result is that the small sulfur particles can be obtained with an unexpectedly high pore volume and surface area.

The intimate admixing of the sulfur and water streams becomes apparent when these streams lose their separate identities and a single spray comprising a heterogeneous mixture of sulfur and water droplets is formed. It is believed that the intimate admixture of water and molten sulfur dispersions in a vapor space such as the atmosphere results in the formation of discrete droplets which have a continuous sulfur phase and which contain water. When the device is operating at optimum conditions, it has been observed that each sulfur droplet is surrounded by a cloud or envelope of water droplets. The water contained in the sulfur droplets does not become entrapped as the sulfur solidifies under the cooling influence of the contained water and surrounding water since studies of the sulfur particles have revealed the sulfur to be moisture free. It is possible that the water within the droplets resists complete envelopment by the sulfur and drains from the solidified sulfur particle, leaving a highly porous structure. It is also possible that the water contained within the sulfur droplets is vaporized by its intimate contact with the molten sulfur and the resulting vaporization "puffs" or expands the sulfur droplet into a highly porous structure as the water vapor escapes from the solidifying droplet. In any event, a novel form of highly porous, particulate sulfur is produced by our method.

The sulfur particles are solidified and fall through the vapor space as substantially non-tacky and hard particles. In the event that the particles when deposited in the storage area are tacky or soft, the rate of water flow relative to sulfur flow can be increased to obviate these characteristics of the particles. Accordingly, it is preferred that the water mass flow be at least 0.6, preferably 0.7 and most preferably 0.8 times the sulfur mass flow.

The method of our invention is preferably practiced with the aforedescribed and illustrated device. Our method can, however, also be practiced by other means capable of forming an intimately admixed water and sulfur dispersion. Examples of such means include a device for forming a combined water and molten sulfur stream under sufficient pressure to prevent any substantial vaporization of the water, e.g., at about 10 to 120 p.s.i.g. immediately upstream of a discharge nozzle capable of finely subdividing the admixture into droplet form such as the nozzles described herein.

Figure 5:
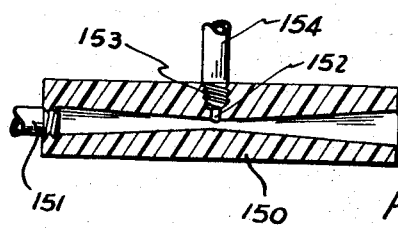
FIG. 5 illustrates an alternative device.

FIG. 5 illustrates an alternative device which can be used to achieve the necessary intimate admixing of the molten sulfur and water streams. This device comprises a nozzle 150 which has a tapped entrance into which is secured conduit 151 and an orifice 152 communicating with tapped bore 153 into which is secured conduit 154. Conduit 151 can be attached to a pressured supply of water and conduit 154 can be attached to a supply of molten sulfur.

The entire assembly can be heated, e.g., electric heating tape can be wrapped about the nozzle and conduit 154. Alternatively, only conduit 154 can be heated by steam or heating tape tracing.

The principal process variables effecting the ultimate properties of the sulfur particles, to be fully discussed hereinafter, are the water and sulfur absolute velocities and their relative velocities and mass flow rates. The water and sulfur velocities are determined by their mass flow rates and the cross-sectional area at the exit defined by the sulfur and water conduits and their respective restriction means, if any. In general the above variables are correlated with one another within the following preferred ranges to produce a sulfur particle having the desirable properties of high porosity and surface area and ease of grindability discussed hereafter. The following table summarizes the ranges of variables:

TABLE I

|  | Broad | Intermediate | Narrow |
|---|---|---|---|
| Exit water velocity, feet/sec | 3–90 | 10–60 | 25–45 |
| Exit sulfur velocity, feet/sec | 3–90 | 10–60 | 25–45 |
| Ratio, water velocity/sulfur velocity | 0.4:1–20:1 | 0.5:1–5:1 | 0.7:1–2:1 |
| Ratio, water mass flow rate/sulfur mass flow rate | 0.2:1–20:1 | 0.6:1–10:1 | 0.7:1–5:1 |

If the sulfur is desired to be placed at a maximum distance from the device, a conical baffle having a minimal angle of inclination can be installed, the angle of the device to the horizon can be optimized to 30–45° and high water and sulfur velocities can be used. Conversely if the sulfur is desired to be located close to the prilling device, a conical member with a greater sidewall angle can be installed and the angle of the prilling device to the horizon is reduced. Reduced water and sulfur velocities may also be utilized. In practice, there is generally no necessity to change conical member 96 to obtain desired trajectories since correct placement of the sulfur particles can be secured simply by variation of stream velocities and/or inclination of boom 4. The water and sulfur velocities, as well as the ratio of water mass flow rate to sulfur mass flow rate may be correlated at the same or different sidewall angle of the conical member to achieve the particularly desired type of sulfur particle. Thus the invention is very flexible in the conveyance of the sulfur particles as well as in their quality.

The relative mass flow rates of the sulfur and water steams is preferably controlled within the aforementioned limits in order for a porous particle to be produced. If the relative sulfur flow is too low, sulfur quickly solidifies without entrapping water within the sulfur droplets and a dense particle may be produced. Additionally, the absolute and relative sulfur and water velocities must be such to form a turbulent region outside the conduits to admix the sulfur and water streams and to contain the sulfur within the water stream or in intimate contact therewith as the streams flow through the atmosphere. The water velocity, however, should not be too high as it has been found that higher water velocities increase the quantity of fines which may not be a desired product. Also, the sulfur velocity should not be too high since it has also been found that the grindability, to be discussed hereinafter, generally decreases with increase in sulfur velocity and/or mass flow.

As was stated earlier, the solidified sulfur particles surprisingly have a high pore volume and surface area. These properties, of course, are generally desirable because the porous sulfur is more reactive, easier to grind to smaller particles, if necessary, and is generally more adaptable to soil utilization and/or chemical processes than the hard, dense prills of the prior art. Thus, the novel sulfur prills obtained by means of the above-described method have definite product quality advantages over the sulfur prills of the prior art.

A distinguishing feature of the sulfur particles is that they have a pore volume of about 0.04–0.20, more generally about 0.05–0.15 and 0.05–0.13 cubic centimeters per gram. The term "pore volume" is known in the art generally as the volume of void space within the pores of a particle.

The sulfur particles possess high specific surface areas, e.g., areas from 60 to 90 square centimeters per gram are common. The specific surface area herein refers to the area within the pores of the particles and thus excludes the external area and the area of any surface, i.e., "channels," which may be penetrated by the above-described microbeads. The particles having an irregular spherical structure with numerous channels and thus the total surface area for contact in chemical processes and/or soil utilization is higher than those given herein.

The sulfur particles have a relatively low bulk density generally about 0.97–1.11, and have a maximum angle repose of about 30–40° and are thus capable of being stored in piles with steeply angled sides which, of course, is advantageous for storage and transportation purposes. The sulfur particles, using conventional X-ray diffraction data, where found to be essentially pure rhombic sulfur and contained no detectable amounts of the monoclinic and amorphous forms. The rhombic sulfur particles were found to have two distinct forms in that about 50 weight percent of the sulfur melted at a distinct and lower melting point (115–117° C.) generally subscribed to an equilibrium mixture of both $S_\pi$ and $S_\lambda$ forms with the balance melting at a higher and distinct melting point (121–123° C.) subscribed to pure $S_\lambda$. Hence, 35–65 weight percent, more generally 40–60 weight percent of the sulfur is pure $S_\lambda$ with the balance being a mixture of $S_\lambda$ and $S_\pi$.

The porous sulfur particles have excellent "grindability," i.e., are easily ground into small-diameter particles having higher surface areas. Grindability is generally defined as the additional surface obtained by grinding a particle with a measured amount of energy over a measured amount of time. For purposes herein, grindability is defined as the percent of particles passing a 100 mesh U.S. Standard Sieve screen by placing, for about two minutes, about 100 grams of sulfur particles passing a 4-mesh screen, but retained on a 6-mesh screen (i.e., a 5-mesh particle) into a standard Waring blender having a one-quart volume container and having an unloaded blade speed of about 1850 r.p.m. In general the sulfur particles produced by our invention have the following range of properties as set forth in Table II below:

TABLE II

|  | Broad | Intermediate | Narrow |
|---|---|---|---|
| Bulk density of mixture, (grams/milliliter) | 0.90–1.3 | 0.97–1.11 | 1.05–1.09 |
| Avg. diameter of particles (inches) | 0.02–0.11 | 0.06–0.10 | 0.08–0.095 |
| Bulk density of −8+14 mesh fraction (grams/milliliter) | 0.9–1.3 | 0.95–1.11 | 0.98–1.02 |
| Percent fines (weight percent −100 mesh) | 0–3 | 0–2 | 0–0.8 |
| Percent intermediate (weight percent −4+20 mesh) | 50–90 | 60–90 | 70–80 |
| Percent coarse (weight percent +4 mesh) | 0–30 | 0–18 | 0–8 |
| Maximum angle of repose (degrees) | 30–40 | 35–39 | 36.0–38.5 |
| Pore volume (cubic centimeters/gram) | 0.04–0.20 | 0.05–0.15 | 0.05–0.13 |
| Specific surface area (square centimeters/gram) | 30–100 | 50–80 | 55–70 |
| Pore volume of −8+14 mesh fraction (cubic centimeters/gram) | 0.04–0.20 | 0.05–0.15 | 0.05–0.13 |
| Weight percent $S_\lambda$ | 35–65 | 40–60 | 48–52 |
| Grindability (weight percent reduced from −4+6 mesh to −100 mesh) | 60–100 | 70–100 | 75–100 |

As will be seen from the following examples the above properties may be achieved by correlating the variables as set forth in Table I.

EXAMPLE 1

The apparatus shown in FIGS. 1–3 was assembled in a sulfur distribution site within sulfur obtained from a sour gas stream of a petroleum refinery is stored for final distribution to the consumer. The device utilized was essentially the same as shown in FIG. 2 except that pipe 68 terminated at about the same point as pipe 78 and the annular steam passageway 74 was eliminated by absence of conduit 76. The water and sulfur streams were thereby separated by a common pipe 78. The device was set at an angle of about 45° from the horizon and the apex angle of conical member 96 attached to the inner pipe 90 was about 20°. The base diameter of conical member 96 was about equivalent to the diameter of pipe 78 and the length of conical 96 was equivalent to the diameter of pipe 78. Molten sulfur having a temperature of about 280° F. was pumped from steam-heated tanks into line 32 and then into passageway 56 of device 2. Water at ambient temperature was pumped into line 40 and thus into passageway 66 of the device. Saturated, 100 p.s.i.g. steam was introduced into the steam jacketed line 32 and thus into space 74 of the device during startup and shutdown of the operation of the device to prevent plugging of the device by solidified sulfur. A mixture of sulfur and water was sprayed out of the device and onto a fiber glass collecting screen placed on the sulfur pile which was about 20 feet high and 30–40 feet from the device. The water pressure was measured just upstream from nozzle 104 to aid in the determination of the water flow. The sulfur flow was measured by means of tank gauges. The cross sectional area of the exits of the sulfur and water conduits were varied from run to run by inserting a larger or smaller sleeve into neck 100 and into nozzle 104 to obtain different sulfur and water velocities at constant flow rates. The sulfur particles collected on the screen were taken from the screen after each run and were analyzed. X-ray diffraction data indicated that the sulfur was essentially pure rhombic sulfur and the particles melted at two distinct melting points, about 50 weight percent melting at a temperature between 115°–117° C. and about 50 percent melting at 121°–123° C. The bulk density, maximum angle of repose, pore volume, surface area, grindability and size distribution were determined as shown in Tables III and IV.

TABLE III

| Run No. | Sulfur velocity, ft./sec. | Water velocity, ft./sec. | Sulfur flow, lbs./min. | Water flow, lbs./min. | Bulk density mixture, gm./ml. | Maximum angle of repose, deg. | Pore volume 10 mesh particle, cm.³/gm. | Calculated surface area, cm.²/gm. | Grindability, percent passing 100-mesh screen |
|---|---|---|---|---|---|---|---|---|---|
| 1 | 31.4 | 35 | 720 | 754 | 1.066 | 36.8 | 0.129 | 97 | 73 |
| 2 | 31.4 | 40 | 720 | 861 | 1.076 | 36.8 | 0.075 | 57 | 80 |
| 3 | 31.4 | 27 | 720 | 968 | 1.254 | 38.4 | 0.071 | 53 | 76 |
| 4 | 33.8 | 27 | 1,020 | 968 | 1.094 | 35.4 | 0.080 | 60 | 64 |
| 5 | 33.8 | 40 | 1,020 | 861 | 1.056 | 36.8 | 0.044 | 33 | 70 |
| 6 | 33.8 | 36 | 1,020 | 775 | 1.029 | 36.8 | 0.051 | 38 | 60 |
| 7 | 33.5 | 34 | 1,200 | 733 | 1.051 | 36.8 | 0.086 | 65 | 63 |
| 8 | 33.5 | 38 | 1,200 | 820 | 1.019 | 38.4 | 0.087 | 66 | 59 |

TABLE IV.—SIZE DISTRIBUTION

| Run No. | Percent sulfur on screen— | | | | | | | | |
|---|---|---|---|---|---|---|---|---|---|
| | 4 | 6 | 8 | 10 | 14 | 20 | 50 | 100 | 200 |
| 1 | 17.5 | 26.6 | 24.5 | 15.5 | 10.2 | 4.2 | 0.6 | 0.3 | 0.2 |
| 2 | 10.2 | 22.8 | 26.0 | 17.3 | 13.5 | 7.1 | 1.7 | 0.7 | 0.5 |
| 3 | 5.2 | 20.7 | 28.2 | 18.4 | 13.0 | 7.5 | 3.1 | 2.1 | 1.2 |
| 4 | 33.9 | 24.8 | 19.9 | 9.8 | 5.5 | 3.3 | 1.9 | 0.8 | 0.5 |
| 5 | 16.3 | 24.9 | 24.3 | 15.3 | 10.9 | 5.2 | 1.8 | 0.6 | 0.44 |
| 6 | 11.3 | 20.2 | 23.3 | 16.9 | 13.8 | 9.5 | 3.7 | 0.9 | 0.4 |
| 7 | 28.4 | 15.7 | 16.7 | 12.5 | 10.6 | 8.7 | 5.1 | 1.6 | 0.6 |
| 8 | 25.6 | 19.0 | 20.5 | 13.0 | 10.0 | 7.5 | 3.6 | 1.4 | 0.5 |

In runs 6–8, wherein the flow of water was low compared to the flow of sulfur, the sulfur particles were tacky and tended to stick together to form a coalesed mass instead of separate discrete particles. Hence, it is preferred that the ratio of the mass flow of water to sulfur be higher than 0.6, preferably higher than 0.7 and most preferably above 0.85.

EXAMPLE 2

A laboratory device for forming an intimate admixture of sulfur and water droplets in a single spray was constructed from a Teflon cylinder 4 inches long and 1⅜ inches in diameter. The stock was drilled with a tapered bore of about ½-inch diameter that tapered to about ¼-inch from each end to form entrance and exit portions with a ¼-inch diameter throat. The entrance section was bored and tapped to receive a threaded, ½-inch tubing which was connected to a water supply. A ⅛-inch diameter bore was drilled through the side of the cylinder to intersect the throat and the bore was then tapped to receive a ½-inch stainless steel threaded tubing. The resultant device had the structure shown in FIG. 5. The opposite end of the tubing had a ball joint to which was secured a 250-milliliter buret that was wrapped with heating tape and the tape was extended about the ball joint and stainless steel tubing.

Molten sulfur was poured into the buret and the heating tape was used to maintain the sulfur molten while water was passed through the nozzle passageway. The sulfur and water emerged from the device as a single heterogenous mixture of sulfur and water droplets which was directed onto a flat surface from which the water was drained. Porous particles of sulfur having diameters from about 1/32 to 1/8 inch diameter were produced.

The experiment was repeated with a device formed from 10 millimeter glass tubing which was constricted to a diameter of about 5 millimeters intermediate its length. The glass tubing downstream of the throat constriction was flared into a trumpet shaped exit portion having a maximum diameter of about 15 millimeters. At a point slightly downstream of the throat, at the expected vena contracta location, a 3-millimeter diameter glass tubing was attached to the exit portion. The device was connected to water and molten sulfur supplies in a manner similar to that aforedescribed and operated to yield porous sulfur particles having diameters from about 1/32 to 1/8 inch average diameter.

A device was constructed with a central tube for molten sulfur terminating in an orifice with two dependent side arms that were pivotably attached to the central tube. The side arms were connected to a source of water under pressure and had orifices at their ends to form water sprays. The arms were positoned to permit directing the water streams at the sulfur stream at variable angles of intersection from 1 to 15 degrees. The water streams, however, could not intersect the sulfur stream at their vena contracta location. The use of the device failed to achieve the formation of a single spray. Instead, three distinct and separate sprays were formed and the sulfur produced by the use of the device was non-porous and soft and tended to agglomerate when it settled onto a level area.

We claim:
1. A method of forming porous, particulate sulfur comprising:
   (a) passing a pressured stream of water through a first conduit having a constriction discharge nozzle and discharging said stream of water therefrom into the atmosphere to form a water spray having a vena contracta from 0.2 to 15 pipe diameters downstream of said constriction;
   (b) passing a pressured stream of molten sulfur through a second conduit also having a constriction discharge nozzle;
   (c) blending said discharged streams by discharging said sulfur stream from said second conduit into the vena contracta of said water spray in a direction which is substantially parallel to said water spray and which has a radial velocity vector insufficient to cause the sulfur to penetrate through the water spray, thereby forming a single spray comprising a heterogenous mixture of intimately admixed sulfur and water droplets; and

(d) controlling the flow rates of said water and sulfur streams to provide discharge velocities thereof between 3 and 90 feet per second to form a turbulent region outside said conduits and to provide relative mass flow rates of 0.6 to 10 weight parts water per weight part of sulfur, thereby cooling and solidifying said sulfur, by said water, into said porous, particulate sulfur.

2. The method of claim 1 wherein said first and second conduits are concentric and the water stream and sulfur stream are discharged as concentric sprays.

3. The method of claim 2 wherein said streams are discharged at exit velocities from 10 to 60 feet per second.

4. The method of claim 2 wherein said streams are discharged at exit velocities from 25 to 45 feet per second.

5. The method of claim 2 wherein said water and sulfur streams are discharged into the atmosphere at an angle to the horizon from 5 to 80 degrees and with sufficient velocity to traject said sulfur onto a preselected storage area.

6. The method of claim 2 wherein the water stream surrounds the sulfur stream.

7. The method of claim 1 wherein steam is passed through an adjacent passageway to said second conduit to heat said stream of molten sulfur.

8. The method of claim 6 wherein the mass flow rate of water to sulfur in said single spray is maintained from 0.7 to about 5 parts water per part sulfur.

9. The method of claim 8 wherein the mass flow rate of water to sulfur in said single spray is maintained about 0.85 part water per part sulfur.

References Cited

UNITED STATES PATENTS

| | | | |
|---|---|---|---|
| 1,397,099 | 11/1921 | Hill | 264—11 |
| 3,538,200 | 11/1970 | Hite | 264—13 |
| 2,652,371 | 9/1953 | Gring | 264—13 |

ROBERT F. WHITE, Primary Examiner

J. R. HALL, Assistant Examiner

U.S. Cl. X.R.

264—13, 14